United States Patent
Malinin et al.

(10) Patent No.: US 11,811,308 B2
(45) Date of Patent: Nov. 7, 2023

(54) MULTI-PHASE POWER FACTOR CORRECTION SYSTEM, CONTROLLER AND METHOD OF CONTROLLING A MULTIPHASE POWER FACTOR CORRECTION SYSTEM

(71) Applicant: Infineon Technologies Austria AG, Villach (AT)

(72) Inventors: Andrey Malinin, Fort Collins, CO (US); Renato Bessegato, Oberhaching (DE)

(73) Assignee: Infineon Technologies Austria AG, Villach (AT)

( * ) Notice: Subject to any disclaimer, the term of this patent is extended or adjusted under 35 U.S.C. 154(b) by 25 days.

(21) Appl. No.: 17/588,815

(22) Filed: Jan. 31, 2022

(65) Prior Publication Data

US 2023/0246542 A1 Aug. 3, 2023

(51) Int. Cl.
*H02M 1/42* (2007.01)
*H02M 1/12* (2006.01)

(52) U.S. Cl.
CPC ....... *H02M 1/4225* (2013.01); *H02M 1/4216* (2013.01); *H02M 1/12* (2013.01)

(58) Field of Classification Search
CPC .... H02M 1/4216; H02M 1/12; H02M 3/1586; H02M 1/0012
See application file for complete search history.

(56) References Cited

U.S. PATENT DOCUMENTS

| | | | |
|---|---|---|---|
| 10,381,915 B1 * | 8/2019 | Dusmez | H02M 1/4233 |
| 10,742,021 B1 * | 8/2020 | Otsuka | H02M 1/32 |
| 2005/0099164 A1 * | 5/2005 | Yang | H02M 1/4225 323/266 |
| 2022/0255451 A1 * | 8/2022 | Fauni | H02M 1/38 |

* cited by examiner

*Primary Examiner* — Alex Torres-Rivera
(74) *Attorney, Agent, or Firm* — Murphy, Bilak & Homiller, PLLC

(57) ABSTRACT

A multi-phase PFC (power factor correction) system, controller for the multi-phase PFC system and method of controlling the multi-phase PFC system are described. The controller includes a digital circuitry configured to calculate a delay value based on a positive current slope and a negative current slope for a first phase of the plurality of phases which is enabled for all load current conditions. In response to an increase in an average current reference, the digital circuitry is configured to enable a second phase of the plurality of phases such that a current output by the second phase is out of phase with a current output by the first phase by an amount corresponding to the delay value as referenced to a beginning of a boost charging portion of a switching cycle for the first phase.

20 Claims, 7 Drawing Sheets

MULTI-PHASE POWER FACTOR CORRECTION SYSTEM, CONTROLLER AND METHOD OF CONTROLLING A MULTIPHASE POWER FACTOR CORRECTION SYSTEM

BACKGROUND

Many high-power applications such as telecom and data center server power supplies utilize a front-end AC-DC rectifier which contains a PFC (power factor correction) front-end stage that regulates the bus voltage to a DC value. The PFC stage shapes the input current of the power supply to be in synchronization with the mains voltage, to maximize the real power drawn from the mains. Active PFC can be achieved by several topologies, including boost converter and totem-pole topologies. In the case of the boost converter topology, the input voltage to the boost converter is a rectified sinusoidal voltage and the average inductor current is continuously conducted through two diodes of a rectifier bridge which causes significant conduction loss, especially at higher power and low-line conditions. The totem-pole PFC topology is a bridgeless circuit in that there is no rectifier diode bridge at the PFC input. Accordingly, the associated rectifier bridge losses are eliminated which leads to higher efficiency and power density. In the case of the totem pole interleaved topology with two or more phases, a second phase (and perhaps a third phase) is conventionally always enabled which introduces additional switching power losses and reduces efficiency at light load conditions while fulfilling the current requirement at heavy (full) load.

To improve efficiency, additional phase(s) should be enabled only when required by the load. Dynamically enabling an additional phase only when required by the load while maintaining low THD (total harmonic distortion) is a challenging task, as the newly inserted phase introduces a new switching current path. If the new phase is not introduced at the proper out of phase position with an already active phase, a subharmonic average current oscillation likely occurs.

A PFC controller that implements sliding mode current control or hysteretic control is a simple and effective control method that involves configuring maximum and minimum peak current comparators in each switching cycle but does not determine the optimal time for dynamically enabling/disabling an additional phase. A new phase is typically enabled at the AC zero crossing which increases power switching losses, or by reducing the switching frequency and then increasing the inductors to deliver the requested power results in lower power density or more board space for accommodating larger inductors.

Thus, there is a need for an improved totem pole interleaved topology for PFC stages which avoids sub-harmonic current oscillation due to the insertion of the new phase.

SUMMARY

According to an embodiment of a controller for a PFC (power factor correction) system having a plurality of phases for delivering current to a load, the controller comprises a digital circuitry configured to: calculate a delay value based on a positive current slope and a negative current slope for a first phase of the plurality of phases which is enabled for all load current conditions; and in response to an increase in an average current reference, enable a second phase of the plurality of phases such that a current output by the second phase is out of phase with a current output by the first phase by an amount corresponding to the delay value as referenced to a beginning of a boost charging portion of a switching cycle for the first phase.

According to an embodiment of a PFC system, the PFC system comprises: a plurality of phases configured to deliver current to a load; and a controller configured to: calculate a delay value based on a positive current slope and a negative current slope for a first phase of the plurality of phases which is enabled for all load current conditions; and in response to an increase in an average current reference, enable a second phase of the plurality of phases such that a current output by the second phase is out of phase with a current output by the first phase by an amount corresponding to the delay value as referenced to a beginning of a boost charging portion of a switching cycle for the first phase.

According to an embodiment of a method of controlling a PFC system having a plurality of phases for delivering current to a load, the method comprises: calculating a delay value based on a positive current slope and a negative current slope for a first phase of the plurality of phases which is enabled for all load current conditions; and in response to an increase in an average current reference, enabling a second phase of the plurality of phases such that a current output by the second phase is out of phase with a current output by the first phase by an amount corresponding to the delay value as referenced to a beginning of a boost charging portion of a switching cycle for the first phase.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide an improved totem pole interleaved topology for PFC (power factor correction) stages and which avoids sub-harmonic current oscillation due to the insertion (enablement) or removal (disablement) of a phase. The time at which a phase is inserted or removed is chosen such that a phase may be dynamically inserted (enabled) or removed (disabled) without increasing the overall THD (total harmonic distortion) but while increasing the power factor which in turn improves the overall system efficiency even though a totem pole interleaved PFC controller implementing sliding mode current control approach may be used. The embodiments described herein provide optimized switching power losses and dynamic phase insertion and removal, while ensuring proper phase interleaving even with sliding mode current control or hysteretic control in a totem pole multi-phase PFC system. Also, on board dedicated components/circuits are not required to dynamically enable/disable a second (or more) phase.

Described next, with reference to the figures, are exemplary embodiments of the totem pole interleaved topology and a related controller, PFC system, and method of controlling the PFC system.

Figure 1:
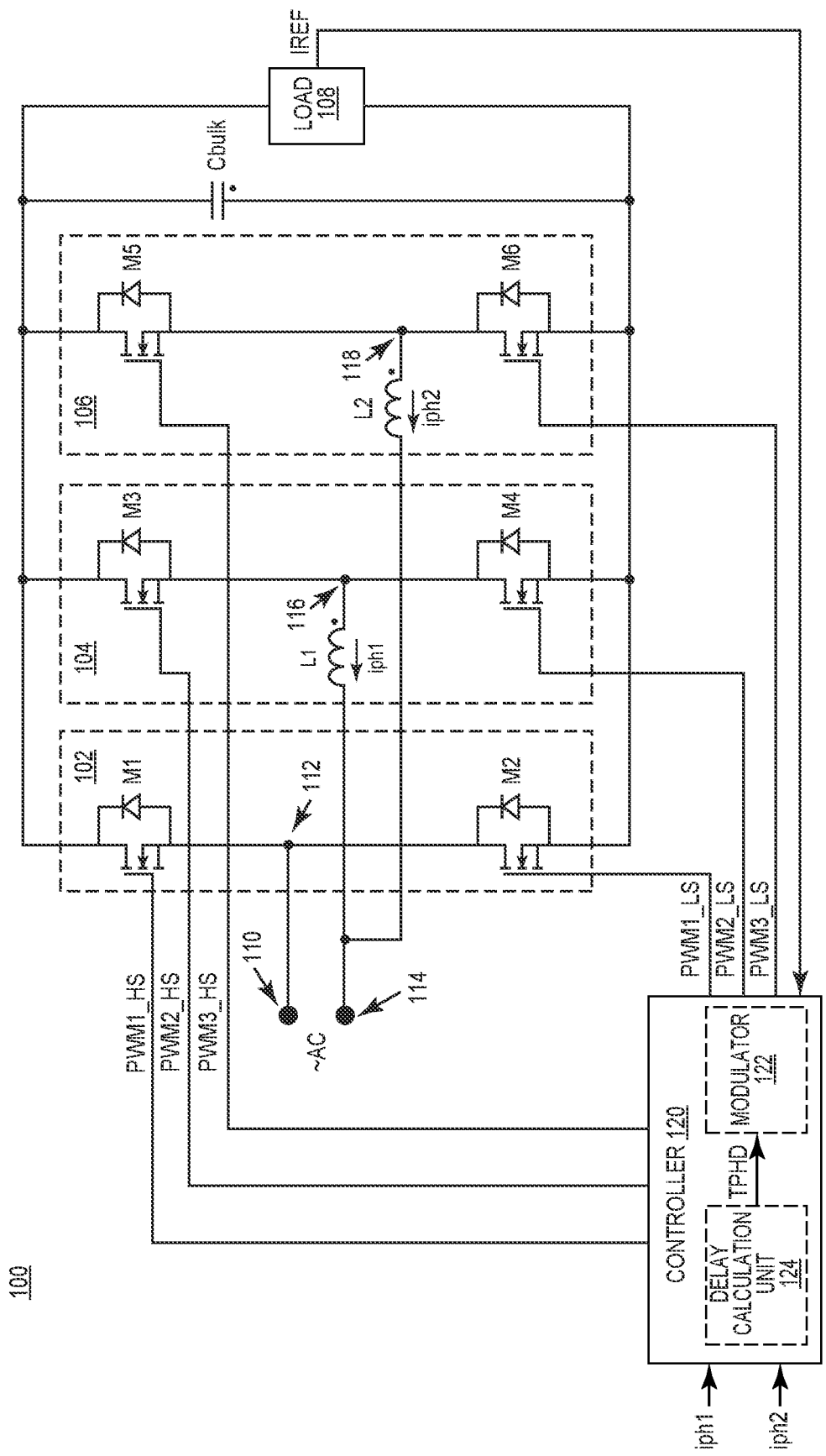
FIG. 1 illustrates a schematic diagram of an embodiment of a multi-phase PFC system.

FIG. 1 illustrates an embodiment of a PFC system 100. The PFC system 100 includes a half bridge synchronous rectifier 102 and at least two phases 104, 106 that form a multi-phase totem pole PFC system for delivering current to a load 108. The half bridge synchronous rectifier 102 may include a series-connected high side (HS) switch M1 and low side (LS) switch M2 coupled in parallel with the load 108. The switches M1, M2 of the half bridge synchronous rectifier 102 may be replaced by diodes so long as the sum of the phases iph1+iph2 does not go negative.

Each phase 104, 106 of the totem pole PFC system includes a series-connected high side (HS) switch M3, M5 and low side (LS) switch M4, M6 coupled in parallel with the load 108. A first terminal 110 that provides AC mains is coupled to the switching node 112 of the half bridge synchronous rectifier 102. A second terminal 114 that provides AC mains is coupled to the respective switching node 116, 118 of each phase 104, 106 through a corresponding inductor L1, L2. The switches M1 through M6 of the totem pole PFC system are illustrated as power MOSFETs (metal-oxide-semiconductor field-effect transistors) with a freewheeling diode. Any suitable power transistors may be used for the totem pole PFC switches M1 through M6 such as but not limited to Si or SiC power MOSFETs, IGBTs (insulated gate bipolar transistors), HEMTs (high-electron mobility transistors), etc.

During a positive AC line half cycle where the voltage at the first terminal 110 is higher than at the second terminal 114, switch M1 is ON and current iph1+iph2 flows through M1. During a negative AC line half cycle where the opposite voltage condition occurs, current iph1+iph2 goes through switch M2.

The first (primary) phase 104 of the PFC system 100 is enabled for all load current conditions. Accordingly, the first phase 104 is enabled under the complete load range. Each additional phase 106 is enabled only under heavier load conditions and disabled under light load conditions. For example, the second phase 106 may be enabled when an average current reference 'IREF' indicated by the load 108 increases a level. If the PFC system 100 has more than two (2) phases 104, 106, a third phase (not shown) may be enabled when the average current reference IREF increases to an even higher level. Still additional phases (not shown) may be enabled for even higher average current reference levels. As the average current reference IREF drops, the previously enabled phases are disabled in the opposite order (third then second, in the example given above). The first phase 104 of the PFC system 100 remains enabled even under all load conditions including light load, except for zero-crossing of the AC line voltage.

The PFC system 100 also includes a controller 120. The controller 120 includes digital circuitry such as a modulator 122 like a PFM (pulse frequency modulator) for controlling the individual switches M1 through M6 of the totem pole PFC system via respective PWM signals PWMx_HS, PWMx_LS, and a delay calculation unit 124 for calculating a delay value 'TPHD'. The delay calculation unit 124 calculates the delay value TPHD based on a positive current slope ('SLOPE_UP' in FIGS. 3 and 5) and a negative current slope ('SLOPE_DN' in FIGS. 3 and 5) for the first (primary) phase 104 of the PFC system 100. As explained above, the first phase 104 is enabled for all load current conditions. In response to an increase in the average current reference IREF indicated by the load 108, the controller 120 enables the second phase 106 of the PFC system 100 such that the current iph2 output by the second phase 106 is out of phase with the current iph1 output by the first phase 104 by an amount ('t_2nd_up' in FIG. 2) which corresponds to the delay value TPHD as referenced to the beginning of a boost charging portion of a switching cycle for the first phase 104.

The switches M3, M4 of the first phase 104 of the totem pole PFC system operate at PWM frequency at any load conditions and function as a boost device. The switches M5, M6 of the second phase 106 operate at a PWM frequency for voltage step-up and therefore function as a boost device when required current is higher. The switches of a third or higher phase (not shown in FIG. 1) also operate at a PWM frequency for voltage step-up and likewise function as a boost device. A bulk capacitor Cbulk delivers power (current) to the load 108 during the discharging phase of the boost.

Operation of the PFC system 100 for two phases 104, 106 is explained next in more detail with reference to FIGS. 2 through 10. The operation may be readily extended to a third or higher phase where each additional phase is constructed like the first and second phases 104, 106. The method illustrated in FIG. 2 may be implemented by a state machine of the controller 120, for example.

Figure 2:
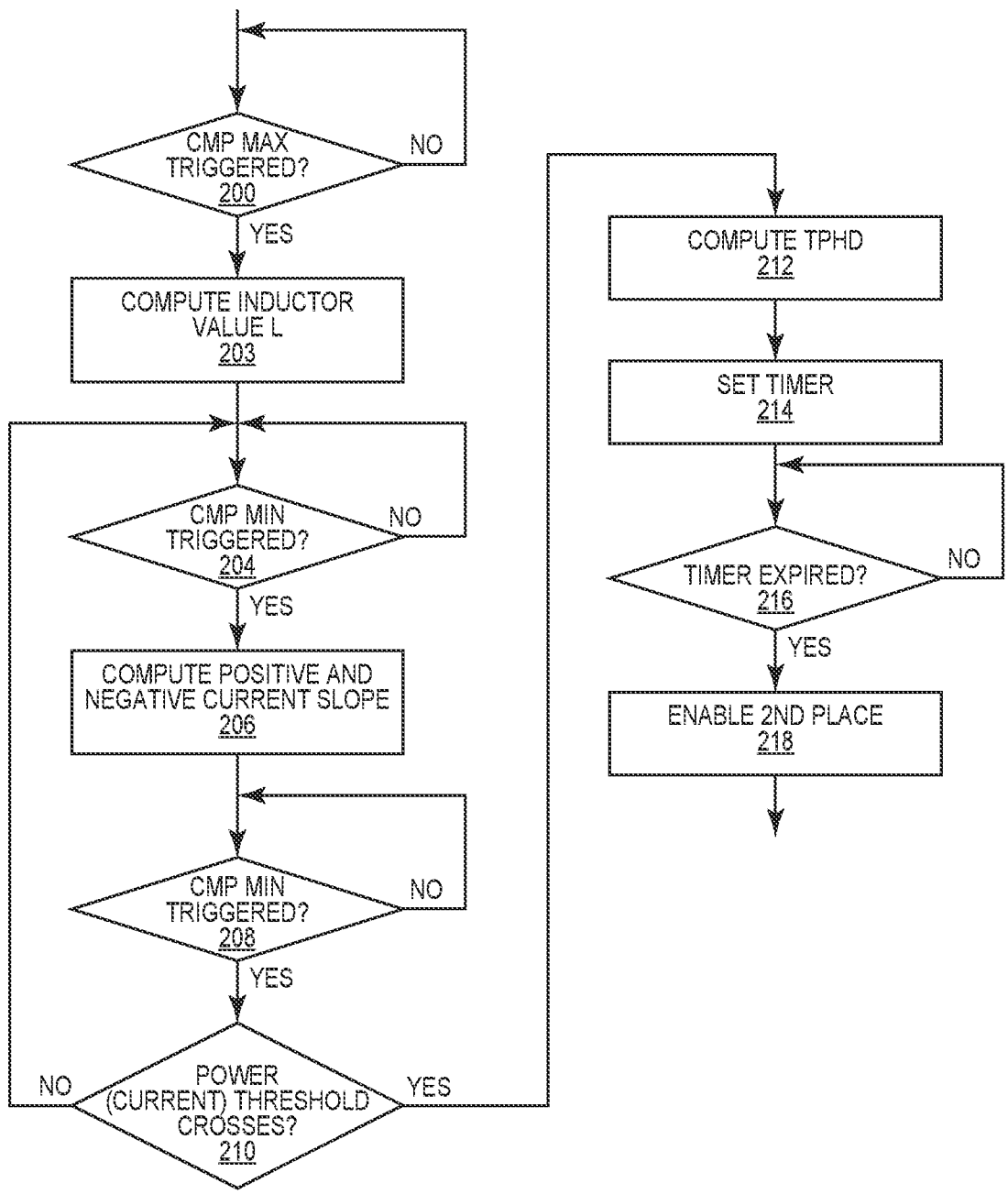
FIG. 2 illustrates a flow diagram of an embodiment of a method of enabling a phase by the multi-phase PFC system.

After a maximum current comparator is triggered (Block 200 in FIG. 2), the controller 120 calculates an inductance 1' associated with the first phase 104 (Block 202 in FIG. 2). In one embodiment, the inductance L is calculated during the first switching cycle after enabling the PFC system 100.

After a minimum current comparator is triggered (Block 204 in FIG. 2), the controller 120 calculates the positive current slope SLOPE_UP and the negative current slope SLOPE_DN for the first phase 104 of the PFC system 100 (Block 206 in FIG. 2). The slope calculations are performed in the switching cycle before the slopes are used to enable another phase. The positive current slope SLOPE_UP may be calculated based on the time duration between a minimum current level Imin at the start of a new switching cycle and a maximum current level Imax reached during the switching cycle. The negative current slope SLOPE_DN may be calculated based on the time duration between the maximum current level Imax of the same switching cycle and the minimum current level Imin which corresponds to the start of the next switching cycle.

In response to a minimum peak current triggered event which occurs when the minimum current comparator is triggered again (Block 208 in FIG. 2) and when a current threshold is crossed (Block 210 in FIG. 2), the delay calculation unit 124 of the controller 120 calculates the delay value TPHD based on the previously calculated positive current slope SLOPE_UP and negative current slope SLOPE_DN for the first phase 104 (Block 212 in FIG. 2). The minimum peak current triggered event occurs before the enabling point of the second phase 106.

The controller 120 sets a timer based on the delay value TPHD (Block 214 in FIG. 2). The timer is triggered during the subsequent switching cycle when the current ph1 of the first phase 104 reaches a minimum value. When the timer expires (Block 216 in FIG. 2), the controller 120 enables the second phase 106 (Block 218 in FIG. 2). As mentioned above, the process for calculating the delay value TPHD and setting of a timer may be repeated for enabling a third or higher phase.

Figure 3:
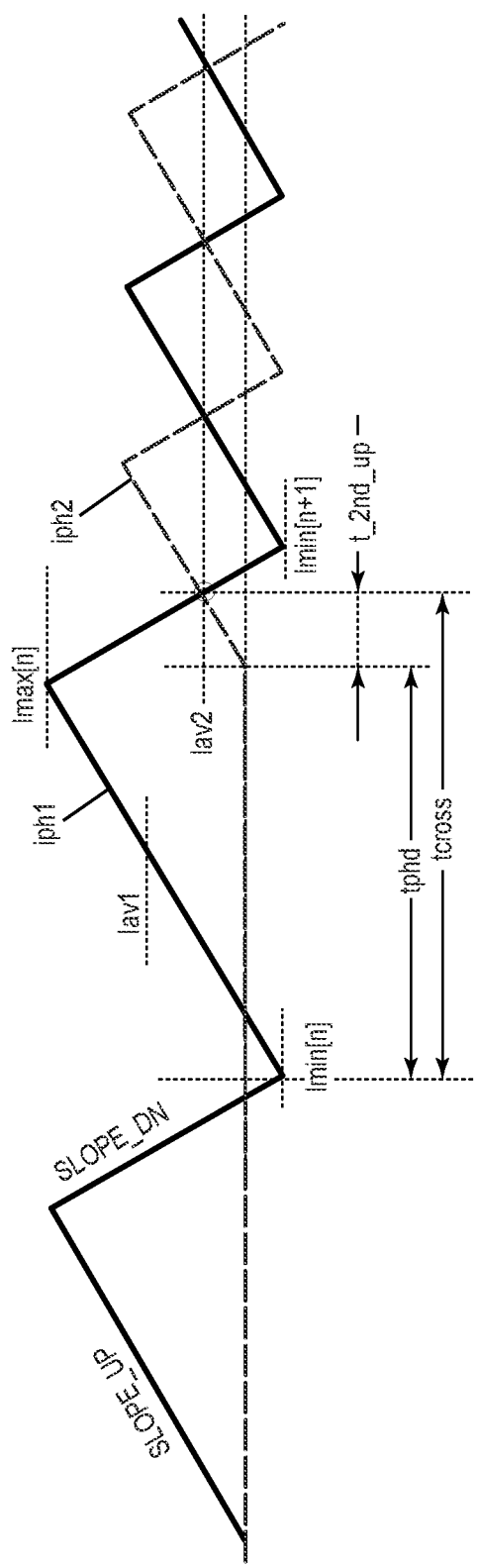
FIGS. 3 through 5, 8 and 9 illustrate respective waveform diagrams associated with the phase enabling method implemented by the PFC system.

As illustrated in FIG. 3, enabling the second phase 106 upon expiration of the timer which is set based on the delay value TPHD ensures the second phase 106 outputs half (½) the average current output during single phase operation, with the first phase 104 outputting the outer half. The timer set based on the delay value TPHD ensures that the phase crossing occurs at a proper level to ensure out-of-phase operation, thereby minimizing output ripple which is beneficial for EMI (electromagnetic interference) and reducing the overall THD.

Based on one or more previous switching cycles, the controller 120 estimates the positive current slope SLOPE_UP and the negative current slope SLOPE_DN for the first phase 104 of the PFC system 100. The controller 120 also calculates when the second phase 106 should be enabled (started) relative to the first phase 104 such that the phase transition occurs so that the average current of the first and second phases 104, 106 during 2-phase operation equals half (½) of the average current during single phase operation. The phase transition occurs in FIG. 3 at 't_2nd_up' from the end of the delay value TPHD.

The phase transition principle may be extended to a third or more higher phase such that, e.g., the average current of three phases during 3-phase operation equals one-third (⅓) of the average current during single phase operation. Having defined the average current value for one phase and for two or more phases, the controller 120 determines the optimal time at which to enable the second or higher phase when crossing the defined power value requiring to enable the next phase.

During a positive semi-period of the input voltage AC, high-side switch M1 of the half bridge synchronous rectifier 102 is in an ON-state and low-side switch M2 of the half bridge synchronous rectifier 102 is in an OFF-state. In this configuration, high-side switch M3 of the first phase 104 (or high-side switch M5 of the second phase 106), low-side switch M4 of the first phase 104 (or low-side switch M6 of the second phase 106), and the power inductor L1 of the first phase (or power inductor L2 of the second phase 106) form a boost DC/DC stage where high-side switch M3 (M5) acts as a master switch and low-side switch M4 (M6) acts as a slave switch. During a negative semi-period of the input voltage AC, high-side M1 of the half bridge synchronous rectifier 102 is in an OFF-state and low-side M2 of the half bridge synchronous rectifier is in an ON-state. In this configuration, the low-side switch M4 of the first phase (or low-side switch M6 of the second phase 106), the high-side switch M3 of the first phase 104 (or high-side switch M5 of the second phase 106), and the power inductor L1 of the first phase 104 (or power inductor L2 of the second phase 106) form a boost DC/DC stage where low-side switch M4 (M6) acts as a master switch and high-side switch M3 (M5) acts as a slave switch.

With only the first phase 104 enabled, the switching activities of switches M3 and M4, connected to the iph1 output, follow the average current profile IAV1 requested by the load 108 for a single phase. With the first and second phases 104, 106 enabled, the switching activities of switches M3 and M4 of the first phase 104 connected to the iph1 output and the switching activities of switches M5 and M6 of the second phase 106 connected to the iph2 output follow the average current profile IAV2 requested by the load 108 for two phases. Accordingly, for single-phase operation, IAV1=IREF. For 2-phase operation, IAV2=IAV1=½*IREF. For 3-phase operation, IAV3=IAV2=IAV1=⅓*IREF, etc.

The controller 120 accommodates the jump between IAV1 to IAV2 when moving from one enabled phase to two or more enabled phases. That is, the controller 120 defines the starting point of the second phase 106 in such a way that the positive current slope of the second phase 106 intersects the negative current slope of the first phase 104 at the IAV2 value as shown in FIG. 3. As explained above, the optimal starting point of the second phase 106 may be determined by calculating the positive current slope SLOPE_UP and the negative current slope SLOPE_DN for the first phase 104 in the previous switching cycle from when the second phase 106 is to be enabled.

Figure 4:
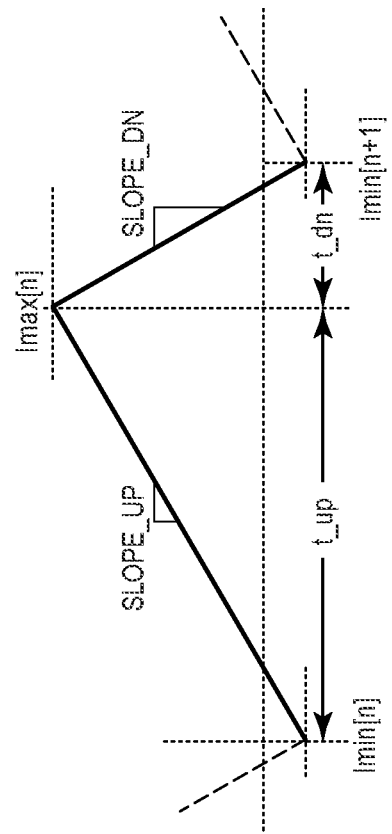

As illustrated in FIG. 4, the controller 120 may calculate the inductance L associated with the first phase 104 during the boost charging phase 't_up'. In one embodiment, the controller 120 calculates the inductance L by multiplying a voltage difference |VAC| applied to the first power inductor L1 during the boost charging portion of the switching cycle for the first phase 104 by a measured time duration t_up of the boost charging portion and by dividing the result of the multiplication by a delta current '|imax[n]-imin[n]|' applied over the boost charging portion, as follows:

$$L = |VAC| * \frac{T_{UP}}{|i\max[n] - i\min[n]|} \quad (1)$$

If the inductance L is calculated during the first switching cycle, [n]=1 and Imin=0 in equation (1).

Figure 5:
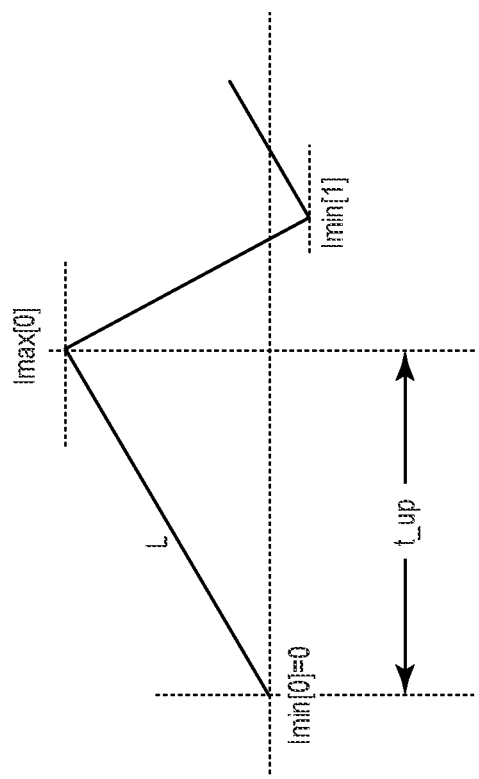
Figure 6:
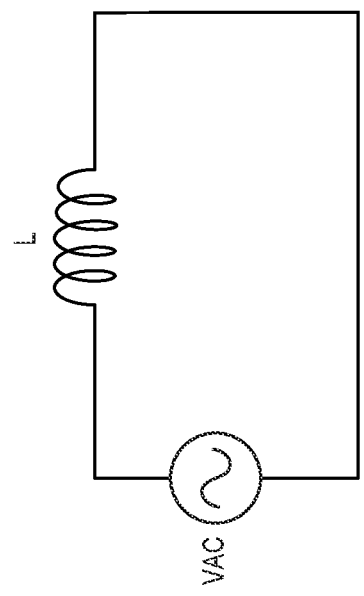
FIG. 6 illustrates a simplified schematic of the PFC system during a boost charging phase.

As illustrated in FIGS. 5 and 6, the controller 120 may calculate the positive current slope SLOPE_UP for the first phase 104 during the boost charging phase t_up where FIG. 6 is a simplified schematic of the PFC system 100 during the boost charging phase t_up. In one embodiment, the controller 120 calculates the positive current slope SLOPE_UP for the first phase 104 by dividing the calculated inductance L by the measured delta voltage |VAC| between the input and output of the PFC system 100 during a boost discharging portion 't_dn' of a switching cycle [n] for the first phase 104, as follows:

$$\text{Slope\_up} = \frac{L}{|VAC|} \quad (2)$$

The positive current slope SLOPE_UP is not calculated directly because the AC line voltage VAC is varying and data from a previous switching cycle may not be valid for the next switching cycle. VAC data are available with less delay and may be even predicted. Error may be compensated by first calculating the inductance L, which is constant, and then applying the calculated inductance L to the slope calculation based on the more recent VAC, e.g., using equation (2).

Figure 7:
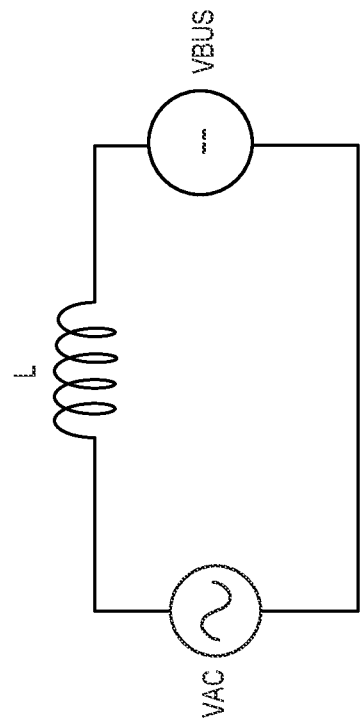
FIG. 7 illustrates a simplified schematic of the PFC system during a boost discharging phase.

FIG. 7 is a simplified schematic of the PFC system 100 during the boost discharging phase t_dn. The controller 120 may calculate the negative current slope SLOPE_DN for the first phase 104 during the boost discharging phase t_dn by dividing the calculated inductance L by the measured delta voltage |VAC| between the input and output of the PFC system 100 during the boost discharging portion t_dn of the same switching cycle [n] for the first phase 104, as follows:

$$\text{Slope\_dn} = \frac{L}{|VBUS - VAC|} \quad (3)$$

where 'VBUS' is the bus voltage being discharged during the boost discharging portion t_dn of switching cycle [n].

As previously described herein, when the load 108 requests an incremental increase in the power being delivered by the PFC system 100, the controller 120 detects the request as the reference average current profile IREF crossing a predefined threshold. When this condition occurs, the controller 120 determines that an additional phase should be enabled.

As illustrated in FIG. 3, to avoid unwanted current ripple, the positive current slope of the second phase 106 should cross the negative current slope of the first phase 104 at the new computed average current profile IAV2. In response to an increase in the average current reference IREF, the controller 120 may calculate a new per phase average current reference value 'IAV2' associated with both the first phase 104 and the second phase 106 being enabled. The delay calculation unit 124 of the controller 120 calculates the delay value TPHD such that the positive current slope for the second phase 106 intersects the negative current slope of the first phase 104 at a crossing point 'Tcross' that corresponds to the new per phase average current reference value IAV2, as shown in FIG. 3.

Figure 8:
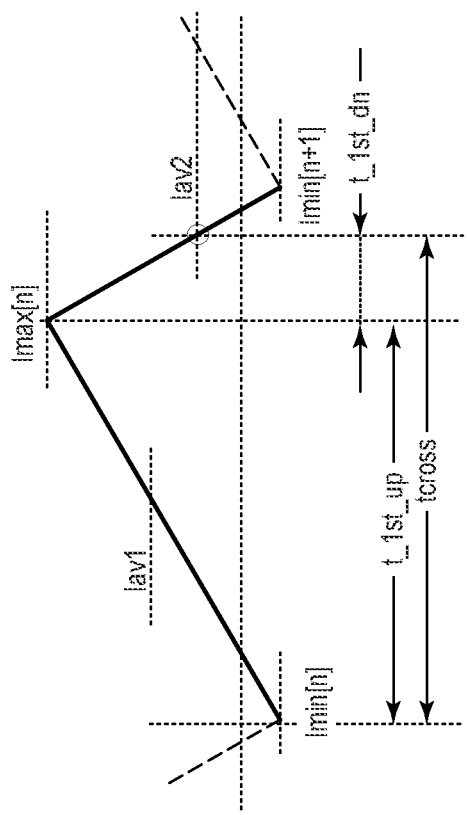

As illustrated in FIG. 8, the crossing point Tcross may be defined as the time 't_1st_up' between a minimum current threshold imin[n] and a maximum current threshold imax[n] for switching cycle n, plus the time 't_1st_dn' between imax[n] and the new per phase average current reference value IAV2 for switching cycle n, as follows:

$$Tcross = \left( \frac{|imax[n] - imin[n]|}{\text{Slope\_up}} + \frac{|IAV2 - imax[n]|}{\text{Slope\_dn}} \right) \quad (4)$$

As established by equation (4), the controller 120 may calculate the crossing point Tcross based on the new per phase average current reference value IAV2, the positive current slope SLOPE_UP for the first phase 104, the negative current slope SLOPE_DN for the first phase 104, a minimum current value imin[n], and a maximum current value imax[n] that is valid for when the first phase 104 is enabled but not the second phase 106. The maximum current value imax[n] is correspondingly reduced once the second phase 106 is enabled, as indicated in FIG. 3.

Figure 9:
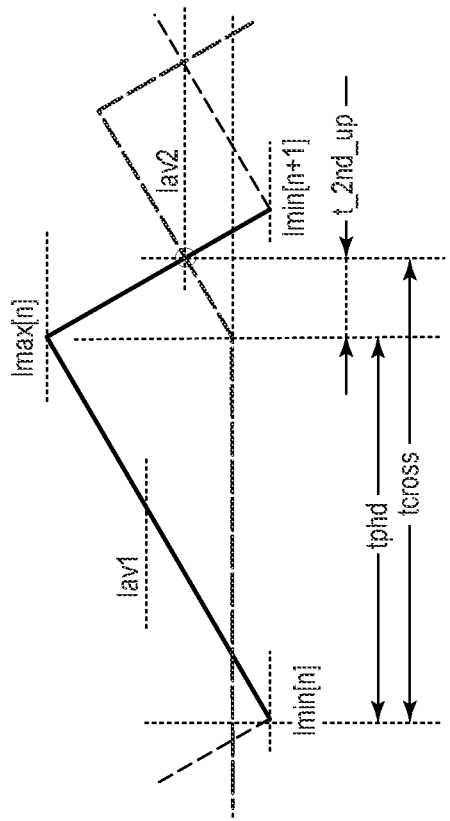

As illustrated in FIG. 9, the controller 120 may define the phase enable starting point TPHD for the second phase 106, which is also referred to herein more generally as delay value, as the previously calculated crossing point Tcross minus the time 't_2nd_up' between the delay value TPHD and the crossing point Tcross, as follows:

$$TPHD = \left( Tcross - \frac{IAV2}{\text{Slope\_up}} \right) \quad (5)$$

As established by equation (5), the controller 120 may calculate the delay value TPHD as the crossing point Tcross minus the new per phase average current reference value IAV2 divided by the positive current slope SLOPE_UP for the first phase 104.

The distance between the minimum current value imin[n] and the starting point TPHD of the second phase 106 may be expressed as follows:

$$TPHD = \frac{|imax[n] - imin[n]| - |iav2|}{\text{slope}_{up}} + \frac{|imax[n] - iav2|}{\text{slope}_{dn}} \quad (6)$$

As established by equation (6), the controller 120 may calculate the time t_2nd_up between the minimum current value imin[n] and the delay value TPHD based on the minimum current value imin[n] and the maximum current value imax[n] during the boost charging portion of the switching cycle for the first phase 104, the new per phase average current reference value IAV2, the positive current slope SLOPE_UP for the first phase 104 and the negative current slope SLOPE_DN for the first phase 104.

Figure 10:
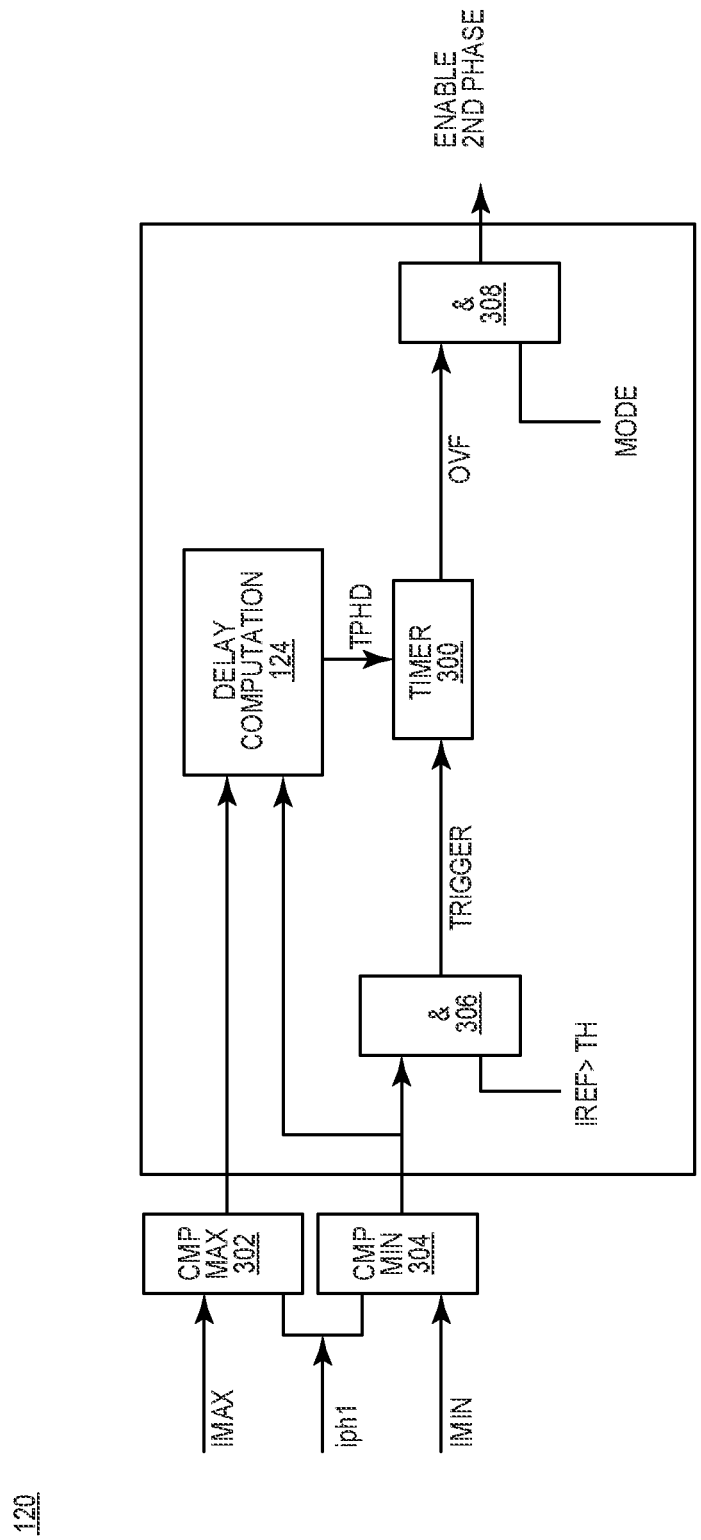
FIG. 10 illustrates a block diagram of an embodiment of digital circuitry included in the PFC controller for enabling an additional phase.

FIG. 10 illustrates an embodiment of the digital circuitry included in the controller 120 for enabling the second phase 106 and which may be implemented as a state machine, for example. According to this embodiment, the digital circuitry includes a timer 300 that is set based on the delay value TPHD and that is triggered when both the average current reference IREF exceeds a threshold TH' and the current iph1 output by the first phase 104 drops to a minimum current value.

A first comparator 302 may determine when the current iph1 output by the first phase 104 reaches a maximum value 'IMAX' and a second comparator 304 may determine when the current iph1 reaches a minimum value 'IMIN'. The delay computation unit 124 calculates the delay value TPHD used for programming the timer 300 based on the comparator outputs, e.g., in accordance with equations (2) through (6).

The timer 300 is triggered by the output 'TRIGGER' of AND logic gate 306, when the output of the minimum current comparator 304 is activated and the average current reference IREF exceeds the threshold TH. Accordingly, the timer 300 is triggered when both the average current reference IREF exceeds the threshold TH and the current iph1 output by the first phase 104 drops to a minimum current value IMIN.

The timer 300 outputs an overflow signal 'OVF' when the timer 300 expires after first being activated. In response to the timer overflow signal OVF, the controller 120 enables the second phase 106. The digital circuitry may include another AND logic gate 308 that allows for enabling of the second phase 106 when both the timer overflow signal OVF is active and the PFC system 100 is in a multi-phase totem pole mode as indicated by a corresponding mode signal 'MODE' provided to the controller 120.

Although the present disclosure is not so limited, the following numbered examples demonstrate one or more aspects of the disclosure.

Example 1. A controller for a PFC (power factor correction) system having a plurality of phases for delivering current to a load, the controller comprising a digital circuitry configured to: calculate a delay value based on a positive current slope and a negative current slope for a first phase of the plurality of phases which is enabled for all load current conditions; and in response to an increase in an average current reference, enable a second phase of the plurality of phases such that a current output by the second phase is out of phase with a current output by the first phase by an amount corresponding to the delay value as referenced to a beginning of a boost charging portion of a switching cycle for the first phase.

Example 2. The controller of example 1, wherein the digital circuitry comprises a timer set based on the delay value and that is triggered when both the average current reference exceeds a threshold and the current output by the first phase drops to a minimum current value, and wherein the digital circuitry is configured to enable the second phase when the timer expires after being triggered.

Example 3. The controller of example 1 or 2, wherein the digital circuitry is configured to calculate an inductance associated with the first phase during the boost charging portion of the switching cycle for the first phase, and wherein the digital circuitry is configured to calculate the positive current slope for the first phase by dividing the calculated inductance by a voltage difference applied to the first phase during the boost charging portion of the switching cycle for the first phase.

Example 4. The controller of example 3, wherein the digital circuitry is configured to calculate the inductance associated with the first phase by multiplying the voltage difference applied to the first phase during the boost charging portion of the switching cycle for the first phase by a measured time duration of the boost charging portion and by dividing a result of the multiplication by a delta current applied over the boost charging portion.

Example 5. The controller of example 3 or 4, wherein the digital circuitry is configured to calculate the negative current slope for the first phase by dividing the calculated inductance by a measured delta voltage between an input and an output of the PFC system during a boost discharging portion of the switching cycle for the first phase.

Example 6. The controller of any of examples 1 through 5, wherein in response to the increase in the average current reference, the digital circuitry is configured to calculate a new per phase average current reference value associated with both the first phase and the second phase being enabled, and wherein the delay value is calculated such that a positive current slope for the second phase intersects the negative current slope of the first phase at a crossing point that corresponds to the new per phase average current reference value.

Example 7. The controller of example 6, wherein the digital circuitry is configured to calculate the crossing point based on the new per phase average current reference value, the positive current slope for the first phase, the negative current slope for the first phase, a minimum current value, and a maximum current value that is valid for when the first phase is enabled but not the second phase.

Example 8. The controller of example 6 or 7, wherein the digital circuitry is configured to calculate the delay value as the crossing point minus the new per phase average current reference value divided by the positive current slope for the first phase.

Example 9. The controller of any of examples 6 through 8, wherein the digital circuitry is configured to calculate the time between the minimum current value and the delay value based on the minimum current value and the maximum current value during the boost charging portion of the switching cycle for the first phase, the new per phase average current reference value, the positive current slope for the first phase and the negative current slope for the first phase.

Example 10. A PFC (power factor correction) system, comprising: a plurality of phases configured to deliver current to a load; and a controller configured to: calculate a delay value based on a positive current slope and a negative current slope for a first phase of the plurality of phases which is enabled for all load current conditions; and in response to an increase in an average current reference, enable a second phase of the plurality of phases such that a current output by the second phase is out of phase with a current output by the first phase by an amount corresponding to the delay value as referenced to a beginning of a boost charging portion of a switching cycle for the first phase.

Example 11. The PFC system of example 10, wherein the controller comprises a timer that is set based on the delay value and that is triggered when both the average current reference exceeds a threshold and the current output by the first phase drops to a minimum current value, and wherein the controller is configured to enable the second phase when the timer expires after being triggered.

Example 12. The PFC system of example 10 or 11, wherein the controller is configured to calculate an inductance associated with the first phase during the boost charging portion of the switching cycle for the first phase, and wherein the controller is configured to calculate the positive current slope for the first phase by dividing the calculated inductance by a voltage difference applied to the first phase during the boost charging portion of the switching cycle for the first phase.

Example 13. The PFC system of example 12, wherein the controller is configured to calculate the inductance associated with the first phase by multiplying the voltage difference applied to the first phase during the boost charging portion of the switching cycle for the first phase by a measured time duration of the boost charging portion and by dividing a result of the multiplication by a delta current applied over the boost charging portion.

Example 14. The PFC system of example 12 or 13, wherein the controller is configured to calculate the negative current slope for the first phase by dividing the calculated inductance by a measured delta voltage between an input and an output of the PFC system during a boost discharging portion of the switching cycle for the first phase.

Example 15. The PFC system of any of examples 10 through 14, wherein in response to the increase in the average current reference, the controller is configured to calculate a new per phase average current reference value associated with both the first phase and the second phase being enabled, and wherein the delay value is calculated such that a positive current slope for the second phase intersects the negative current slope of the first phase at a crossing point that corresponds to the new per phase average current reference value.

Example 16. The PFC system of example 15, wherein the controller is configured to calculate the crossing point based on the new per phase average current reference value, the positive current slope for the first phase, the negative current slope for the first phase, a minimum current value, and a maximum current value that is valid for when the first phase is enabled but not the second phase.

Example 17. The PFC system of example 15 or 16, wherein the controller is configured to calculate the delay value as the crossing point minus the new per phase average current reference value divided by the positive current slope for the first phase.

Example 18. The PFC system of any of examples 15 through 17, wherein the controller is configured to calculate the time between the minimum current value and the delay value based on the minimum current value and the maximum current value during a boost charging portion of a switching cycle for the first phase, the new per phase average current reference value, the positive current slope for the first phase and the negative current slope for the first phase.

Example 19. A method of controlling a PFC (power factor correction) system having a plurality of phases for delivering current to a load, the method comprising: calculating a delay value based on a positive current slope and a negative current slope for a first phase of the plurality of phases which is enabled for all load current conditions; and in response to an increase in an average current reference, enabling a second phase of the plurality of phases such that a current output by the second phase is out of phase with a current output by the first phase by an amount corresponding to the delay value as referenced to a beginning of a boost charging portion of a switching cycle for the first phase.

Example 20. The method of example 19, wherein calculating the delay value comprises: in response to the increase in the average current reference, calculating a new per phase average current reference value associated with both the first phase and the second phase being enabled; and calculating the delay value such that a positive current slope for the second phase intersects the negative current slope of the first phase at a crossing point that corresponds to the new per phase average current reference value.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A controller for a PFC (power factor correction) system having a plurality of phases for delivering current to a load, the controller comprising a digital circuitry configured to:
    calculate a delay value based on a positive current slope and a negative current slope for a first phase of the plurality of phases which is enabled for all load current conditions; and
    in response to an increase in an average current reference, enable a second phase of the plurality of phases such that a current output by the second phase is out of phase with a current output by the first phase by an amount corresponding to the delay value as referenced to a beginning of a boost charging portion of a switching cycle for the first phase.

2. The controller of claim 1, wherein the digital circuitry comprises a timer set based on the delay value and that is triggered when both the average current reference exceeds a threshold and the current output by the first phase drops to a minimum current value, and wherein the digital circuitry is configured to enable the second phase when the timer expires after being triggered.

3. The controller of claim 1, wherein the digital circuitry is configured to calculate an inductance associated with the first phase during the boost charging portion of the switching cycle for the first phase, and wherein the digital circuitry is configured to calculate the positive current slope for the first phase by dividing the calculated inductance by a voltage difference applied to the first phase during the boost charging portion of the switching cycle for the first phase.

4. The controller of claim 3, wherein the digital circuitry is configured to calculate the inductance associated with the first phase by multiplying the voltage difference applied to the first phase during the boost charging portion of the switching cycle for the first phase by a measured time duration of the boost charging portion and by dividing a result of the multiplication by a delta current applied over the boost charging portion.

5. The controller of claim 3, wherein the digital circuitry is configured to calculate the negative current slope for the first phase by dividing the calculated inductance by a measured delta voltage between an input and an output of the PFC system during a boost discharging portion of the switching cycle for the first phase.

6. The controller of claim 1, wherein in response to the increase in the average current reference, the digital circuitry is configured to calculate a new per phase average current reference value associated with both the first phase and the second phase being enabled, and wherein the delay value is calculated such that a positive current slope for the second phase intersects the negative current slope of the first phase at a crossing point that corresponds to the new per phase average current reference value.

7. The controller of claim 6, wherein the digital circuitry is configured to calculate the crossing point based on the new per phase average current reference value, the positive current slope for the first phase, the negative current slope for the first phase, a minimum current value, and a maximum current value that is valid for when the first phase is enabled but not the second phase.

8. The controller of claim 6, wherein the digital circuitry is configured to calculate the delay value as the crossing point minus the new per phase average current reference value divided by the positive current slope for the first phase.

9. The controller of claim 6, wherein the digital circuitry is configured to calculate a time between a minimum current value and the delay value based on the minimum current value and a maximum current value during the boost charging portion of the switching cycle for the first phase, the new per phase average current reference value, the positive current slope for the first phase and the negative current slope for the first phase.

10. A PFC (power factor correction) system, comprising:
    a plurality of phases configured to deliver current to a load; and
    a controller configured to:
        calculate a delay value based on a positive current slope and a negative current slope for a first phase of the plurality of phases which is enabled for all load current conditions; and
        in response to an increase in an average current reference, enable a second phase of the plurality of phases such that a current output by the second phase is out of phase with a current output by the first phase by an amount corresponding to the delay value as referenced to a beginning of a boost charging portion of a switching cycle for the first phase.

11. The PFC system of claim 10, wherein the controller comprises a timer that is set based on the delay value and that is triggered when both the average current reference exceeds a threshold and the current output by the first phase drops to a minimum current value, and wherein the controller is configured to enable the second phase when the timer expires after being triggered.

12. The PFC system of claim 10, wherein the controller is configured to calculate an inductance associated with the first phase during the boost charging portion of the switching cycle for the first phase, and wherein the controller is configured to calculate the positive current slope for the first phase by dividing the calculated inductance by a voltage difference applied to the first phase during the boost charging portion of the switching cycle for the first phase.

13. The PFC system of claim 12, wherein the controller is configured to calculate the inductance associated with the first phase by multiplying the voltage difference applied to the first phase during the boost charging portion of the switching cycle for the first phase by a measured time duration of the boost charging portion and by dividing a result of the multiplication by a delta current applied over the boost charging portion.

14. The PFC system of claim 12, wherein the controller is configured to calculate the negative current slope for the first phase by dividing the calculated inductance by a measured delta voltage between an input and an output of the PFC system during a boost discharging portion of the switching cycle for the first phase.

15. The PFC system of claim 10, wherein in response to the increase in the average current reference, the controller is configured to calculate a new per phase average current reference value associated with both the first phase and the second phase being enabled, and wherein the delay value is calculated such that a positive current slope for the second phase intersects the negative current slope of the first phase at a crossing point that corresponds to the new per phase average current reference value.

16. The PFC system of claim 15, wherein the controller is configured to calculate the crossing point based on the new per phase average current reference value, the positive current slope for the first phase, the negative current slope for the first phase, a minimum current value, and a maximum current value that is valid for when the first phase is enabled but not the second phase.

17. The PFC system of claim 15, wherein the controller is configured to calculate the delay value as the crossing point minus the new per phase average current reference value divided by the positive current slope for the first phase.

18. The PFC system of claim 15, wherein the controller is configured to calculate a time between a minimum current value and the delay value based on the minimum current value and a maximum current value during a boost charging portion of a switching cycle for the first phase, the new per phase average current reference value, the positive current slope for the first phase and the negative current slope for the first phase.

19. A method of controlling a PFC (power factor correction) system having a plurality of phases for delivering current to a load, the method comprising:
    calculating a delay value based on a positive current slope and a negative current slope for a first phase of the plurality of phases which is enabled for all load current conditions; and
    in response to an increase in an average current reference, enabling a second phase of the plurality of phases such that a current output by the second phase is out of phase with a current output by the first phase by an amount corresponding to the delay value as referenced to a beginning of a boost charging portion of a switching cycle for the first phase.

20. The method of claim 19, wherein calculating the delay value comprises:
    in response to the increase in the average current reference, calculating a new per phase average current reference value associated with both the first phase and the second phase being enabled; and
    calculating the delay value such that a positive current slope for the second phase intersects the negative current slope of the first phase at a crossing point that corresponds to the new per phase average current reference value.

* * * * *

UNITED STATES PATENT AND TRADEMARK OFFICE
CERTIFICATE OF CORRECTION

PATENT NO. : 11,811,308 B2
APPLICATION NO. : 17/588815
DATED : November 7, 2023
INVENTOR(S) : A. Malinin et al.

It is certified that error appears in the above-identified patent and that said Letters Patent is hereby corrected as shown below:

On the Title Page

Item (54)/Title (Line 4), and in the Specification, Column 1, (Line 4), please change "MULTIPHASE" to -- MULTI-PHASE --.

Signed and Sealed this
Twenty-seventh Day of February, 2024

Katherine Kelly Vidal
*Director of the United States Patent and Trademark Office*